United States Patent
Raghavan et al.

(10) Patent No.: US 12,395,977 B2
(45) Date of Patent: Aug. 19, 2025

(54) SYSTEM AND METHOD FOR DUAL MODE SCHEDULING OF DATA TRANSFERS IN A NETWORK

(71) Applicant: RAKUTEN MOBILE, INC., Tokyo (JP)

(72) Inventors: Sathyadeep Raghavan, Tokyo (JP); Pankaj Shete, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/002,958

(22) PCT Filed: Nov. 1, 2022

(86) PCT No.: PCT/US2022/048507
§ 371 (c)(1),
(2) Date: Dec. 22, 2022

(87) PCT Pub. No.: WO2024/096870
PCT Pub. Date: May 10, 2024

(65) Prior Publication Data
US 2024/0244609 A1 Jul. 18, 2024

(51) Int. Cl.
*H04W 72/04* (2023.01)
*H04W 24/10* (2009.01)
*H04W 72/12* (2023.01)

(52) U.S. Cl.
CPC ................. *H04W 72/12* (2013.01)

(58) Field of Classification Search
CPC . H04W 72/23; H04W 24/10; H04W 72/0446; H04W 24/02; H04W 60/04;
(Continued)

(56) References Cited

U.S. PATENT DOCUMENTS

2012/0324041 A1* 12/2012 Gerber ............... H04W 8/20
709/217
2013/0035082 A1* 2/2013 Sen .................. H04W 4/18
455/414.4
(Continued)

FOREIGN PATENT DOCUMENTS

WO 2009/022822 A2 2/2009

OTHER PUBLICATIONS

International Search Report issued Mar. 1, 2023 in Application No. PCT/US22/48507.
(Continued)

*Primary Examiner* — Sai Aung
(74) *Attorney, Agent, or Firm* — Sughrue Mion, PLLC

(57) ABSTRACT

For dual-mode scheduling of a data transfer, first, second, and third data transfer cycles are actuated. The first cycle is actuated based on a scheduling request of the data transfer, and includes selecting a transfer time for transferring a first data packet, and allocating at least one system resource. The second cycle is actuated based on receipt of a signal indicating readiness of a second data packet, and includes determining a signal parameter value, selecting a transfer time, and maintaining a configuration of the allocated system resource based on the signal parameter value. The third cycle is actuated based on receipt of a signal indicating readiness of a third data packet, and includes determining an updated signal parameter value, selecting a transfer time, and altering the configuration of the allocated system resource prior to the transfer time based on the updated signal parameter value.

20 Claims, 6 Drawing Sheets

(58) Field of Classification Search
CPC ............. H04W 74/006; H04W 72/542; H04W 36/0088; H04W 76/11; H04W 28/0268; H04W 48/17; H04W 72/1263
See application file for complete search history.

(56) References Cited

U.S. PATENT DOCUMENTS

| | | | |
|---|---|---|---|
| 2014/0038656 A1* | 2/2014 | Navda | H04W 24/10 455/509 |
| 2017/0317938 A1 | 11/2017 | Abraham et al. | |
| 2018/0324823 A1 | 11/2018 | Martin et al. | |
| 2024/0089968 A1* | 3/2024 | Maamari | H04W 72/23 |
| 2024/0365322 A1* | 10/2024 | Islam | H04W 72/20 |

OTHER PUBLICATIONS

Written Opinion issued Mar. 1, 2023 in Application No. PCT/US22/48507.

* cited by examiner

SYSTEM AND METHOD FOR DUAL MODE SCHEDULING OF DATA TRANSFERS IN A NETWORK

CROSS REFERENCE TO RELATED APPLICATIONS

This application is a National Stage of International Application No. PCT/US2022/048507 filed Nov. 1, 2022.

BACKGROUND

1. Field

Apparatuses and methods consistent with example embodiments relate to the scheduling of data transfers in a network, and more particularly, to the implementation of two scheduling modes, one for initialization or re-initialization of a scheduling configuration, and one for simplified operation.

2. Description of Related Art

In a mobile telecommunications network or similar network, a device wirelessly connects to a nearby base station or radio unit, which in turn is connected to the network as a whole. Data flow to and from the device is controlled by the connected base station, and by other processing units managing the base station at various levels of the network.

It is standard operating procedure in the related art to schedule an upload or download of data between the mobile device and the connected base station, using a scheduling request sent in advance. This allows system resources to be preemptively dedicated to the data transfer, such that everything is configured correctly for the transfer at the moment it is scheduled to begin, reducing latency. The scheduling additionally allows a pre-check that the needed resources are in fact available and not already dedicated to other activity.

SUMMARY

It is an object of the disclosed system and method to reduce latency and improve efficiency in scheduling and performing transfer of data over a network.

It is another object of the disclosed system and method to identify a balance between efficiency and accuracy in scheduling and performing transfer of data over a network.

It is yet another object of the disclosed system and method to adaptively shift between modes of operation responsive to whether an existing allocation of resources is suitable to a data transfer.

In accordance with certain embodiments of the present disclosure, a method is provided for dual-mode scheduling of a data transfer between a network and a user device, on at least one processor. The method includes, based on a scheduling request of the data transfer received from the user device, operating a first data transfer cycle. The first data transfer cycle is operated by selecting a first transfer time for transferring a first data packet of the data transfer, and allocating at least one system resource for use in the data transfer, the allocated system resource provided with a configuration for the data transfer. The method further includes, based on receipt of a signal indicating readiness for transfer of a second data packet of the data transfer, operating a second data transfer cycle. The second data transfer cycle is operated by determining a value of at least one predetermined signal parameter of the user device, selecting a second transfer time for transferring the second data packet of the data transfer, and maintaining the configuration of the allocated system resource during the second transfer time based on the value of the predetermined signal parameter. The method further includes, based on receipt of a signal indicating readiness for transfer of a third data packet of the data transfer, operating a third data transfer cycle. The third data transfer cycle is operated by determining an updated value of the predetermined signal parameter of the user device, selecting a third transfer time for transferring the third data packet of the data transfer, and altering the configuration of the allocated system resource prior to the third transfer time based on the updated value of the predetermined signal parameter.

In accordance with other embodiments of the present disclosure, an electronic device is provided for dual-mode scheduling of a data transfer between a network and a user device. The device includes at least one wireless communication module configured to transmit and receive a wireless signal, at least one non-volatile memory electrically configured to store computer program code, and at least one processor operatively connected to the at least one wireless communication module and the at least one non-volatile memory. The at least one processor is configured to operate as instructed by the computer program code. The computer program code includes first data transfer code configured to cause at least one of the at least one processor to, based on a scheduling request of the data transfer received from the user device through the at least one wireless communication module, select a first transfer time for transferring a first data packet of the data transfer, and allocate at least one system resource for use in the data transfer, the allocated system resource provided with a configuration for the data transfer. The computer program code further includes second data transfer code configured to cause at least one of the at least one processor to, based on receipt of a signal indicating readiness for transfer of a second data packet of the data transfer through the at least one wireless communication module, determine a value of at least one predetermined signal parameter of the user device, select a second transfer time for transferring the second data packet of the data transfer, and maintain the configuration of the allocated system resource during the second transfer time based on the value of the predetermined signal parameter. The computer program code further includes third data transfer code configured to cause at least one of the at least one processor to, based on receipt of a signal indicating readiness for transfer of a third data packet of the data transfer through the at least one wireless communication module, determine an updated value of the predetermined signal parameter of the user device, select a third transfer time for transferring the third data packet of the data transfer, and alter the configuration of the allocated system resource prior to the third transfer time based on the updated value of the predetermined signal parameter.

In accordance with still other embodiments of the present disclosure, a non-transitory computer-readable recording medium is provided. The recording medium has recorded thereon instructions executable by at least one processor to perform a method for dual-mode scheduling of a data transfer between a network and a user device. The method includes, based on a scheduling request of the data transfer received from the user device, operating a first data transfer cycle. The first data transfer cycle is operated by selecting a first transfer time for transferring a first data packet of the data transfer, and allocating at least one system resource for use in the data transfer, the allocated system resource provided with a configuration for the data transfer. The method further includes, based on receipt of a signal indicating readiness for transfer of a second data packet of the data transfer, operating a second data transfer cycle. The second data transfer cycle is operated by determining a value of at least one predetermined signal parameter of the user device, selecting a second transfer time for transferring the second data packet of the data transfer, and maintaining the configuration of the allocated system resource during the second transfer time based on the value of the predetermined signal parameter. The method further includes, based on receipt of a signal indicating readiness for transfer of a third data packet of the data transfer, operating a third data transfer cycle. The third data transfer cycle is operated by determining an updated value of the predetermined signal parameter of the user device, selecting a third transfer time for transferring the third data packet of the data transfer, and altering the configuration of the allocated system resource prior to the third transfer time based on the updated value of the predetermined signal parameter.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
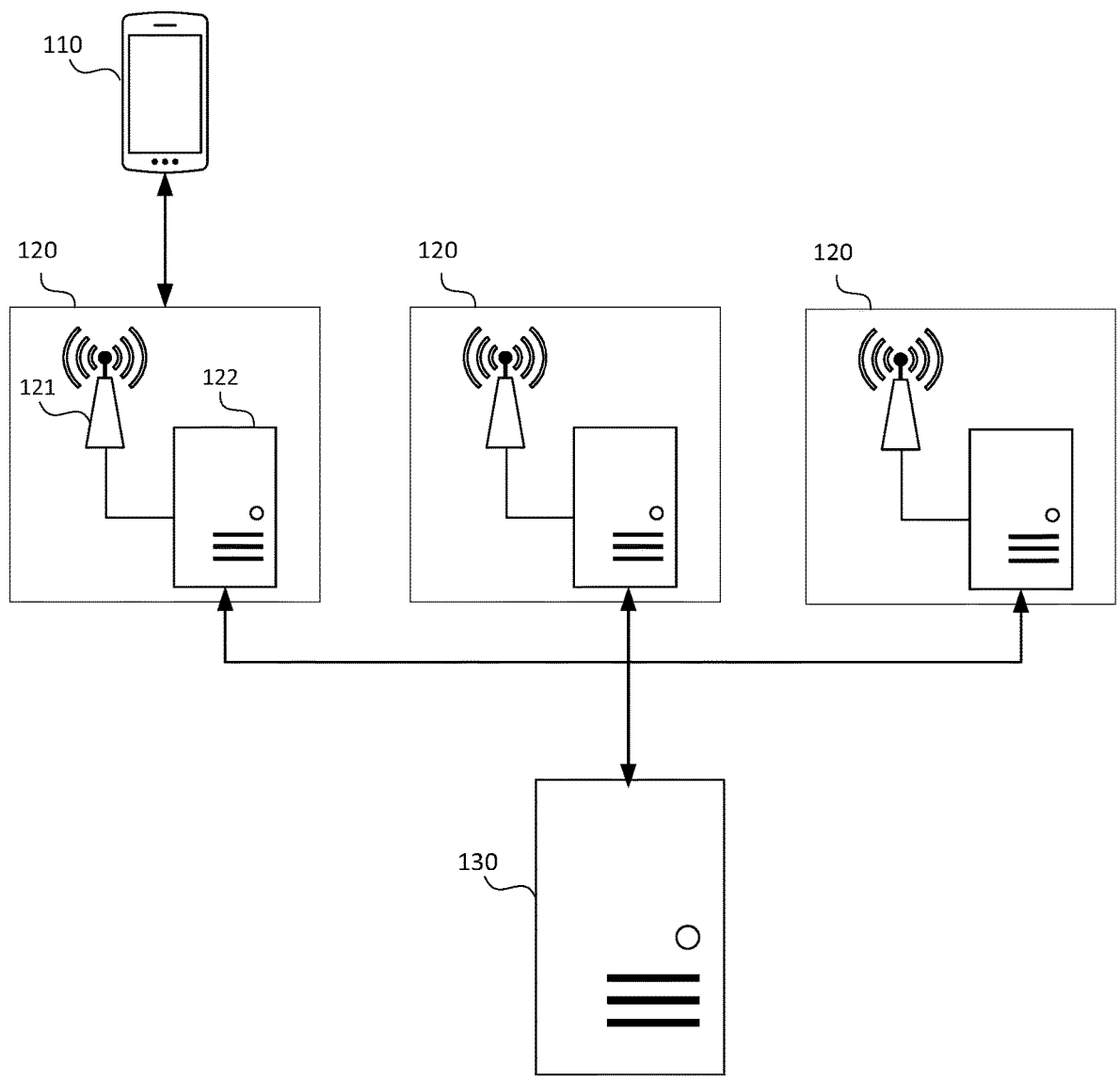
FIG. 1 depicts an illustrative example of network components and the connections therebetween, in accordance with an embodiment.

The following detailed description of example embodiments refers to the accompanying drawings. The same reference numbers in different drawings may identify the same or similar elements. The embodiments are described below in order to explain the disclosed system and method with reference to the figures illustratively shown in the drawings for certain exemplary embodiments for sample applications.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

It is noted that the principles disclosed herein are generally applicable to all forms of networks, including but not limited to internet service provider networks such as optical fiber and cable networks; traditional phone networks; and both wired and wireless networks in a structure, complex, or other localized area. However, throughout the disclosure, the network being analyzed and managed by the disclosed system will be primarily referred to as a mobile network for convenience and clarity purposes.

As briefly described in the Background, network base stations and other network data hubs may schedule the timing of data transfers therethrough, to ensure the necessary resources are allocated and configured correctly at the scheduled time of the transfer. The scheduled time may be one of a series of time slots, which may be selected such that there will be sufficient time before the time slot to complete the allocation and configuration.

FIG. 1 depicts an illustrative example of network components and the connections therebetween, in accordance with an exemplary embodiment.

Using wireless signals, a mobile device 110 (sometimes described as a "user device" or "user equipment") connects to a nearby base station 120 of a network 100.

The base station 120 may include a transceiver 121, such as a radio tower, which receives signals from the mobile device 110 and sends signals to the mobile device 110. A base station 120 may include a plurality of transceivers 121, which may be intended for redundancy or distribution of load, for providing different characteristics (e.g. different directional focus, different frequency, etc.), or both. For ease of illustration, only one transceiver 121 is depicted in FIG. 1.

The base station 120 may also include a radio unit 122, which may be a computer processor or other computing device coupled to the transceiver 121, and which is configured to operate the transceiver, to process incoming and outgoing signals, and to communicate with the network 100 as a whole, among other functions, some of which will be detailed herein. The radio unit 122 may more specifically be a base node (NodeB), an evolved NodeB (eNB), or a next generation NodeB (gNB) system, among other suitable base station processing systems.

As relevant to the present disclosure, a radio unit 122 of a base station 120, a corresponding transceiver 121 of the base station 120, and the base station 120 itself will sometimes be described interchangeably herein for convenience and brevity. For example, a mobile device 110 will, in places herein, be described as connecting with or transmitting to a radio unit 122, and the presence of an intervening transceiver 121, as well as other components of the corresponding base station 120, will be assumed. In other places herein, a mobile device 110 will be described as generally interacting with a base station 120, or the base station 120 will be described as performing some function, without identifying the specific components involved.

In some network configurations, all functions of a base station 120 are handled by the radio unit 122, which is located at the same physical site as the transceiver 121 to which the mobile device 110 connectively couples. In other network configurations, such as the one depicted in FIG. 1, radio units 122 at one or more base stations 120 may be collectively managed by a distributed unit 130 connected to the radio units 122. The distributed unit 130 handles certain "mid-level" functions between the base stations 120 and the network 100 as a whole which would otherwise be handled by the radio units 122 themselves. This relieves some of the processing load on the radio units 122, and can be a particular benefit for functions which do not operate constantly, such that the distributed unit 130 is unlikely to be handling functions for all radio units 122 at once. Other benefits of including a distributed unit 130 are also known. The distributed unit 130 may be a computer processor or other computing device, and may be located centrally relative to its corresponding plurality of radio units 122. Use of distributed units such as described above is common in networks operating on the 5th Generation Wireless (5G) standard or later, although it is not a requirement of 5G networks, nor is it exclusive thereto.

Although a division of functions between a radio unit 122 and a distributed unit 130 will be assumed herein, it is noted that the same principles are applicable when all such functions are handled by a radio unit 122 without the support of a distributed unit 130. Similarly, individual functions which are described as performed by a distributed unit 130 may be instead performed by a radio unit 122, notwithstanding the inclusion of a distributed unit 130 in a system implementation. Correspondingly, when either a radio unit 122 or a base station 120 are described as performing some function, it is within the scope of the disclosed system and method that the function is instead performed by the corresponding distributed unit 130.

Further levels of units and processing—for example, a central unit or control unit—are also a part of certain network configurations. For ease of depiction, these levels are not depicted or described herein, but it is again noted that functions of the radio unit 122 and distributed unit 130 described herein may be further distributed to these other levels.

For brevity of description, the data transfers described herein are assumed to be uploads—that is, transfers from a mobile device 110 through the base station 120. It will be recognized that the same principles are applicable to downloads to the mobile device 110.

The timing and frequency of scheduling requests can be varied according to the embodiment. For example, FIG. 2A is a sequence diagram illustrating an example execution of a set of operations for scheduling data transfers individually, in accordance with an embodiment.

In an example network configuration, a mobile device 110 is connected to a radio unit 122 of a base station 120, which is in turn managed by a distributed unit 130.

Figure 2A:
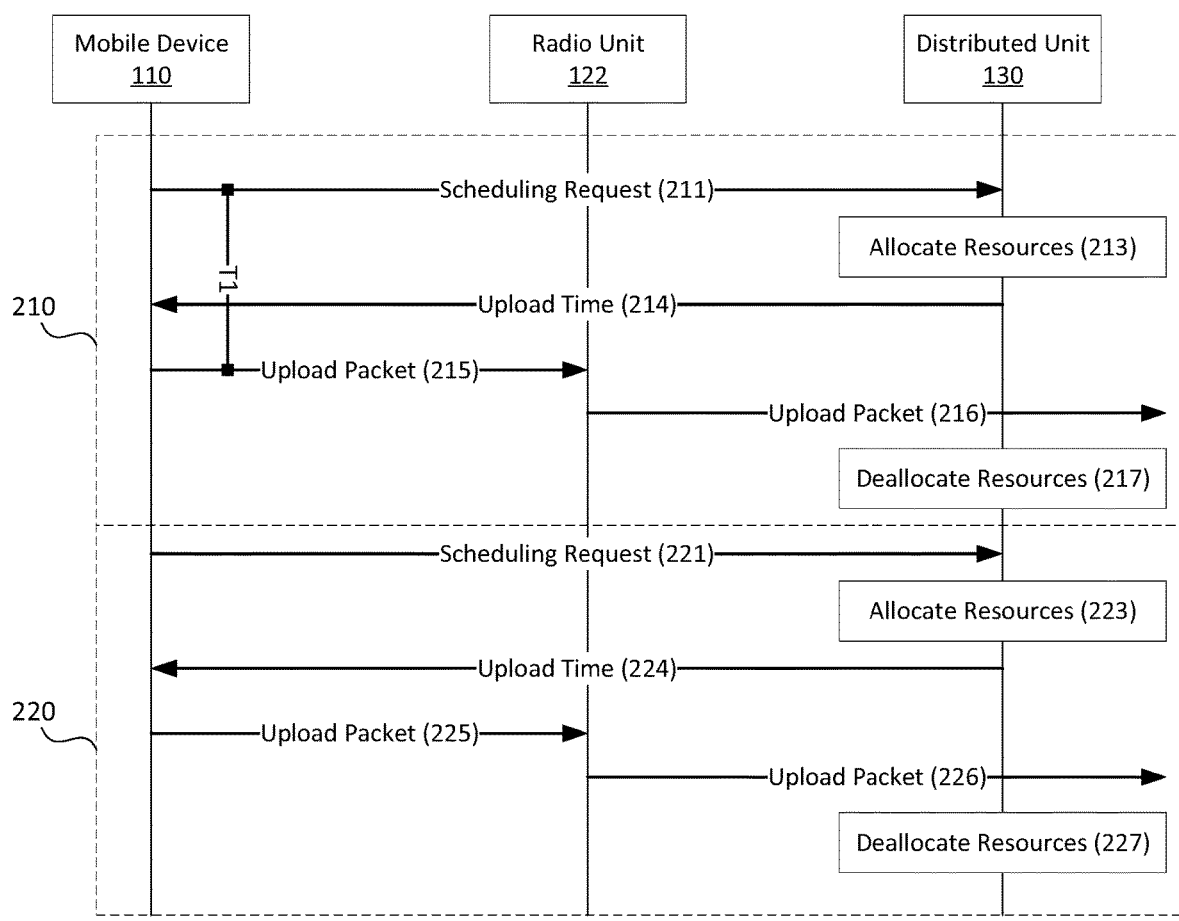
FIG. 2A is a sequence diagram illustrating an example execution of a set of operations for scheduling data transfers individually, in accordance with an embodiment.

According to the embodiment and example execution illustrated in FIG. 2A, the mobile device 110 interacts with the radio unit 122 in a sequence of upload cycles 210, 220, etc. to complete a data upload.

In FIG. 2A, a first upload cycle (or first transfer cycle) 210 is illustrated as an example execution of an upload cycle. In the first cycle 210, at 211, the mobile device 110 sends a scheduling request to the radio unit 122 for a first data upload, based on the information presently in its buffer for upload. This scheduling request includes information necessary to configure the resources of the base station 120 and related components. For example, suitable information may be provided as downlink control information (DCI) according to the 5G standard. In the depicted embodiment, the scheduling request is forwarded to the distributed unit 130 for processing there. The mobile device 110 will thereafter monitor for a response from the radio unit 122.

At 213, the distributed unit 130 selects or schedules a time for the upload—that is, an upload time or transfer time—and begins allocating and configuring resources in preparation for the upload. The resources can include resources at both the distributed unit 130 and radio unit 122, and can additionally include other features of the base station 120 such as a particular transceiver 121 of a plurality of transceivers, or a particular transceiver configuration such as its orientation. Each resource is provided a configuration which is suitable for the mobile device 110, in its current state, and for the data upload; such may be determined in accordance with content of the scheduling request, and/or by additional data received from the mobile device 110, directly or indirectly. The upload time should be scheduled to provide enough time to complete the configuration; this "wait period" to permit completion of the configuration is labeled T1, and may be termed an initialization wait period. The wait period is illustrated to begin at the receipt of the scheduling request at 211, but may instead begin at another predetermined time, such as at the selection of the upload time, so long as it is consistent with the beginning of other wait periods described further herein.

At 214, the radio unit 122 provides the scheduled time to the mobile device 110, along with other data and instructions for coordinating the upload, such as a frequency or other identifier for an upload channel that the mobile device 110 should use to upload the data. For example, the radio unit 122 may identify a Physical Uplink Shared Channel (PUSCH), according to the 5G standard, assigned for the transfer.

At 215, at the scheduled time, the mobile device 110 uploads data to the radio unit 122, for example through the identified upload channel. During transmission, the data may be in any suitable transmission format. However, for convenience of description, a unit of data uploaded during a single cycle will be termed a data packet herein. It is noted that this data packet may in some embodiments be of a consistent and predetermined size, but in other embodiments may have a variable size, determined at or shortly before the time of transmission by factors including but not limited to upload speed, signal quality, and error rate. In particular, the size of the data packet may be determined according to an expected size which can be practically transmitted over the course of an allotted time slot.

At 216, the radio unit 122 sends the uploaded data onward through the distributed unit 130 to the network, and at 217, the distributed unit 130 releases or deallocates the resources for use by the next mobile device to need them.

There may be considerable data in an upload buffer of the mobile device 110, such that the total amount may be too large to upload in a single cycle, and is instead sent in a plurality of packets over the course of a plurality of cycles. Therefore, the above set of operations is repeated with every upload cycle, as depicted in FIG. 2A. For example, a second upload cycle 220 is illustrated as another example execution of an upload cycle, and includes equivalents of operations 211 through 217 as, respectively, operations 221 through 227. The first upload cycle 210 results in the transfer of at least a first data packet, and the second upload cycle 220 results in the transfer of at least a second data packet.

The second scheduling request 221 of the second upload cycle 220 is depicted as beginning after operations 216 and 217. However, the second upload cycle 220 may in an alternative embodiment overlap in time with the first upload cycle 210, by transmitting the second scheduling request 221 promptly upon completion of the first upload at 215 without waiting for the radio unit 122 to complete operations 216 and 217.

Full equivalence between operations 211 through 217 and operations 221 through 227 can be inefficient, adding unnecessary delays in transmission with each cycle, as redundant information is re-processed and redundant actions are repeated, to thereby increase latency. Additionally, the resources are reallocated and reconfigured with each cycle. Ideally, redundancy between upload cycles 210 and 220 should be minimized to reduce this latency.

Figure 2B:
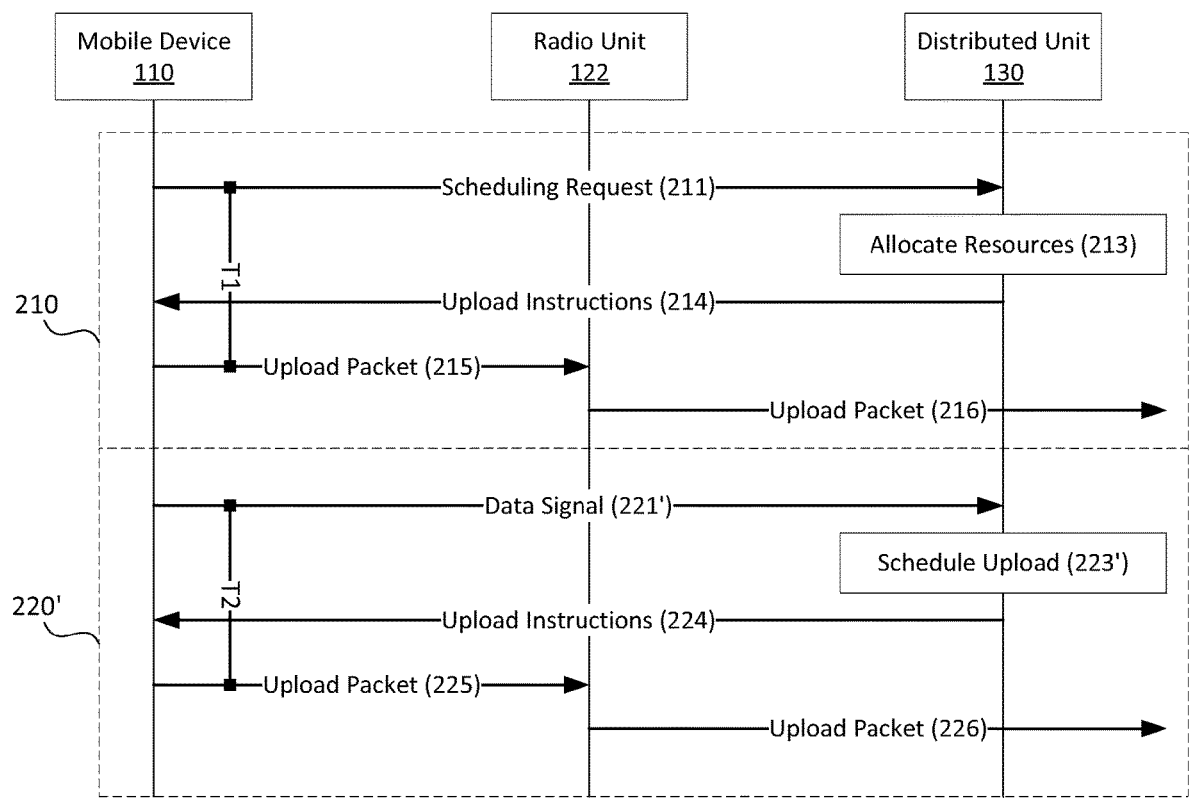
FIG. 2B is a sequence diagram illustrating an example execution of a set of operations for simplified scheduling of a set of data transfers, in accordance with an embodiment.

FIG. 2B is a sequence diagram illustrating an example execution of a set of operations for simplified scheduling of a set of data transfers, in accordance with an embodiment.

A first upload cycle 210 is illustrated in FIG. 2B as an example execution of an initializing upload cycle. The first upload cycle 210 proceeds largely as in FIG. 2A. Notably, however, the scheduling request 211 may be based on a larger portion of the upload buffer of the mobile device 110 than a single packet, and the radio unit 122 or distributed unit 130 may preserve this information into the second upload cycle 220'. Relatedly, operation 217 is omitted and the resources remain allocated to upload operations of the mobile device 110.

A second upload cycle 220' is illustrated in FIG. 2B as an example execution of a simplified upload cycle. In the second upload cycle 220', instead of sending a complete scheduling request as in operation 221 of FIG. 2A, the mobile device 110 sends a signal indicating that more data is ready for transfer and will be uploaded, at 221'. For example, this signal may be a buffer status report (BSR) according to the 5G standard, which indicates that there is more data in the buffer to be uploaded. For convenience, this signal will be termed a simplified request herein.

Operation 223' then schedules the next upload time, but does not allocate or configure resources in preparation for the upload, as the resources are already prepared for receiving data from the mobile device 110. Instead, a present configuration of the allocated resources is maintained. Additionally, because no time for resource allocation is required, the upload time can be scheduled relatively promptly, after a wait period T2 which is shorter in duration than the initialization wait period T1. The wait period T2 may be termed a shortened wait period.

Operations 224 through 226 proceed as before, although the radio unit 122 optionally omits any information at 224 which is duplicative of the information sent at 214. Operation 227 is omitted and the resources remain allocated.

Further simplified upload cycles, which are equivalent to second upload cycle 220', continue until the BSR indicates that the upload buffer is empty. At that point, the distribution unit 130 deallocates the resources (not depicted).

While this approach reduces redundancy in the signals coordinating the transfer, and also delays in transmission resulting from deallocating and reallocating resources, it relies on the assumption that the information provided in the initial scheduling request will not change, and the configuration of the resources will remain correct, for all cycles.

The scheduling request, or related signals, may provide information about the mobile device 110, such as its physical location relative to the base station 120, its signal strength, its signal quality, its transmission error rate, and other parameters describing its present status and transmission capabilities. The radio unit 122 or distributed unit 130 may schedule the upload based in part on these parameters, and may additionally use these qualities to determine exactly what resources to allocate or how to configure them, at 213. Additionally, the upload instructions may include reconfiguration instructions to be executed by the mobile device 110. For example, the mobile device 110 may be instructed to adjust its modulation and coding rate, as defined by a Modulation and Coding Scheme (MCS) or similar, when the mobile device 110 is experiencing low signal quality with the base station 120.

In the example illustrated in FIG. 2A, a new scheduling request is sent at 221 and the distribution unit 130 can newly allocate and configure resources at 223, based on changes to these parameters. However, in the example illustrated in FIG. 2B, the radio unit 122 does not receive a new scheduling request, and the resource configuration from 213 is not altered at 223' and following. This configuration could fail to adapt to changing conditions at the mobile device 110, such as a drop in signal quality due to movement of the mobile device 110. This can result in delays of failures in the upload process. Ideally, the distributed unit 130 should still recognize and adapt to such condition changes.

Figure 2C:
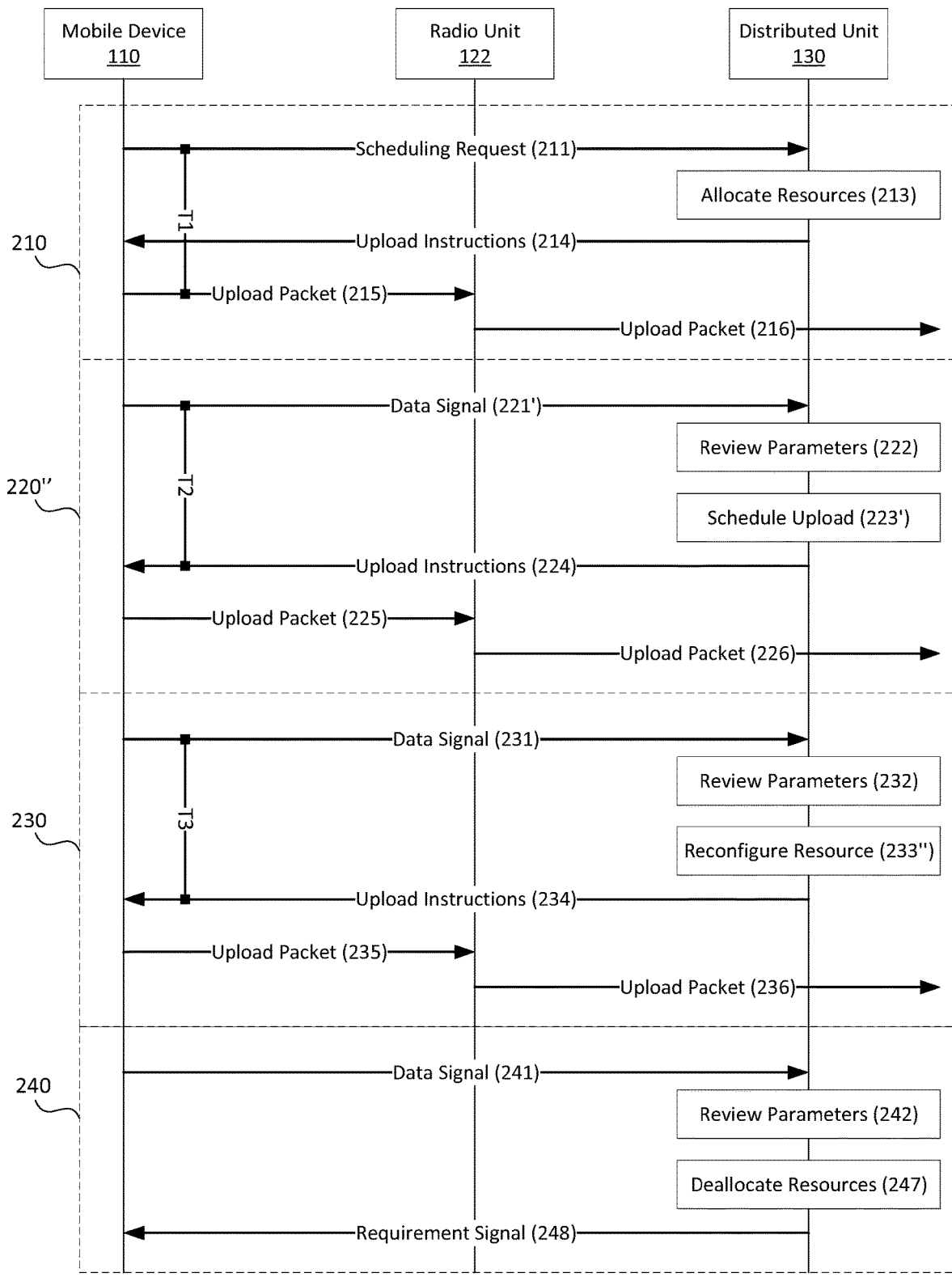
FIG. 2C is a sequence diagram illustrating an example execution of a set of operations for adaptively shifting between two scheduling modes during the scheduling of a set of data transfers, in accordance with an embodiment.

FIG. 2C is a sequence diagram illustrating an example execution of a set of operations for adaptively shifting between two scheduling modes during the scheduling of a set of data transfers, in accordance with an embodiment.

A first upload cycle 210 and a second upload cycle 220" are illustrated in FIG. 2C as example executions of an initializing upload cycle and a simplified upload cycle, respectively. The first upload cycle 210 proceeds largely as in FIG. 2B, and likewise operations 221' and 223 through 226 of the second upload cycle 220" proceed largely as in second upload cycle 220' in FIG. 2B.

However, additionally, at 222, values of signal parameters of the mobile device 110 are determined, and reviewed by the distributed unit 130. The signal parameters can include aspects such as block error rate (BLER), signal to interference plus noise ratio (SINR), and orientation respective to the base station 120, among other possibilities. It is determined from this review whether the parameter values, or the condition of the signal in general, have changed enough to affect the present configuration, and if so, whether reconfiguration is sufficient to adapt to new signal conditions.

In the example second upload cycle 220″ illustrated in FIG. 2C, at 222 it is determined that reconfiguration is not necessary based on the values of the signal parameters. Operations 223 through 226 of the second upload cycle 220″ therefore proceed largely as in second upload cycle 220′ in FIG. 2B.

A third upload cycle 230 is also illustrated in FIG. 2C as another example execution of an simplified upload cycle. The third upload cycle 230 begins with operation 231, which is the equivalent of operation 221, and operation 232, which is the equivalent of operation 222. However, in the example third upload cycle 230 illustrated in FIG. 2C, at 232, it is determined, based on the updated values of the signal parameters that reconfiguration is necessary, but sufficient to adapt to the new signal conditions. Therefore, at 233″, the allocated resources are reconfigured as needed as part of the scheduling of the next upload time. The next upload time may be scheduled after a wait period T3 longer than the shortened wait period T2, in order to provide sufficient time to alter the configuration of the allocated resources. This wait period T3 may be, for example, of the same duration as the initialization wait period T1, although other durations are within the scope of this disclosure. Operations 234 through 236 then proceed as equivalents to operations 224 through 226.

A fourth upload cycle 240 is also illustrated in FIG. 2C as another example execution of an simplified upload cycle. The fourth upload cycle 240 begins with operation 241, which is the equivalent of operation 221, and operation 242, which is the equivalent of operation 222. However, in the example fourth upload cycle 240 illustrated in FIG. 2C, at 242, it is determined that the new signal conditions are too severe to overcome. A schedule time is therefore not granted, and there is no equivalent to operations 223 through 226. Instead, at 247, the resources are deallocated. Then, at 248 a signal is sent through the radio unit 122 to the mobile device 110 that simplified scheduling is disabled, and that the resources require a re-initialization by a complete scheduling request. From this point, and until the signal conditions are restored to acceptable levels, further cycles will be equivalent to the first upload cycle 210, and will require a complete scheduling request for each cycle.

In certain embodiments, equivalents to operations 223 through 226 may still proceed after a determination at 242 that the new signal conditions are too severe to overcome, with a third data packet being uploaded to the extent possible, before the resources are deallocated and simplified scheduling is disabled at 247 and 248 respectively.

Whether a given signal condition, or combination thereof, is severe enough to disable simplified scheduling and revert to standard scheduling, can be determined by any suitable logic. In a simple example, if a value of any of a predetermined set of signal parameters (for example, BLER or SINR) is outside a predetermined range (which may be unbounded in one direction), the resources are deallocated at 247 and simplified scheduling is disabled at 248. More complicated examples, including but not limited to a machine learning model trained to identify severe conditions, are also within the scope of the disclosed system and method.

Figure 3:
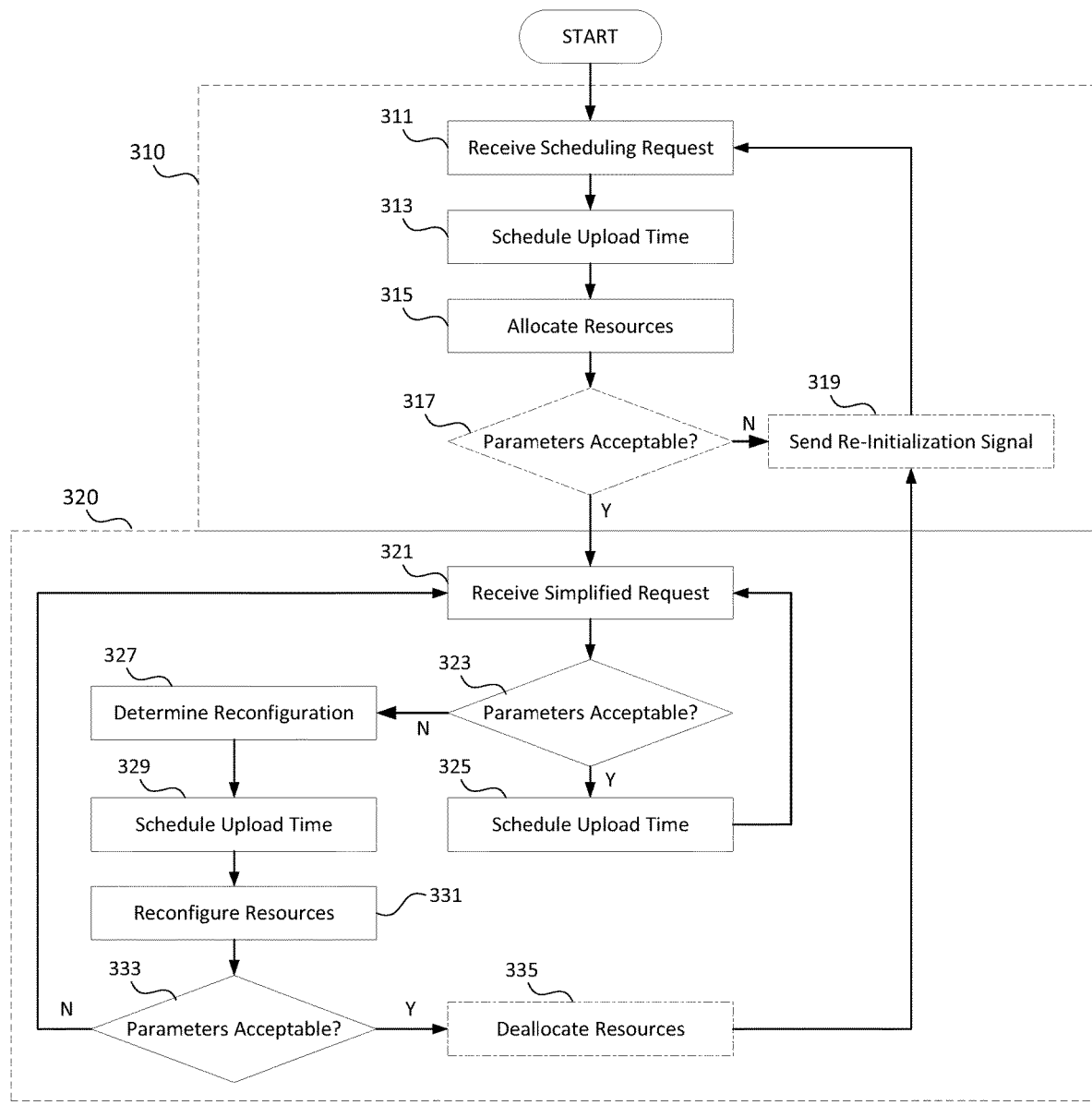
FIG. 3 is a flow diagram illustrating a flow of processes for a dual-mode scheduling of data transfers, in accordance with an embodiment.

FIG. 3 is a flow diagram illustrating a flow of processes for a dual-mode scheduling of data transfers, in accordance with an embodiment. The illustrated processes may be performed on the radio unit 122, the distributed unit 130, or some combination thereof. It is noted that the order of operations illustrated in FIG. 3 diverges from the order implied by the sequence diagrams of FIGS. 2A-2C; both orderings are within the scope of the disclosed system and method.

At 311, an upload scheduling request is received from a user device, for example mobile device 110. At 313, an upload time is scheduled for the user device based on an initialization wait period, and provided to the user device along with other upload instructions. At 315, the resources are allocated and configured in accordance with the scheduling request.

At 321, a simplified request, such as a buffer status report, is received from the user device. At 323, values of signal parameters of the mobile device are determined and checked, to determine if they are acceptable for transfers. Here, "acceptable" may mean that the values conform to the present configuration of the allocated resources, that the values are within a predetermined tolerance threshold or range as designated for an upload or other transfer, or both. If so (Yes at 323), then at 325, an upload time is scheduled for the user device based on a shortened wait period, and provided to the user device, and then the flow returns to 321 to await the next simplified request. If not (No at 323), then the flow proceeds to 327.

At 327, a suitable reconfiguration of the allocated resources is determined. This may include adjustment of a Modulation and Coding Scheme (MCS) of the mobile device 110, or of power of a UEDX, among many other suitable options. As reconfiguration possibilities are numerous and their suitability is dependent on the specific values of the selected parameters, and as appropriate case-by-case selection between the available options will be understood by those of skill in the art without undue experimentation, such will not be detailed herein.

At 329, an upload time is scheduled for the user device based on the initialization wait period, or on another wait period longer in duration than the shortened wait period, and provided to the user device. Certain additional reconfigurations may be necessary to perform on the mobile device 110, such as adjustment of an MCS, and so the scheduled time may be accompanied by reconfiguration instructions to be executed by the mobile device 110.

At 331, the base station resources, the mobile device resources, or both are reconfigured. At 333, it is determined whether the reconfiguration resolved the conditions which caused failure at 323, such that corrected values of the signal parameters, as determined after reconfiguration, are now acceptable for transfers; for example, within the predetermined value range. If so (Yes at 333), the flow returns to 321 to await the next simplified request. If not (No at 333), then a simplified request is determined insufficient to maintain upload quality, and instead the flow returns to 311 to await a new, complete upload scheduling request.

Optionally, before returning to 311, the base station resources are deallocated at 335. In an alternative embodiment, deallocation happens as part of the next occurrence of operation 315, for any resources which need to be released before reconfiguration.

Optionally, before returning to 311, a signal is sent to the mobile device 110 at 319, indicating that a simplified request will be ineffective and the resources instead must be re-initialized in accordance with a complete upload scheduling request; in this manner, the mobile device may default to sending a simplified request in each cycle following the initial cycle, unless it receives an instruction to do otherwise. In an alternative embodiment (not illustrated), a signal is sent that a simplified request will be effective before returning to 321 (from either 325 or 333); in this manner, the mobile device may default to sending a complete upload scheduling request in each cycle unless it receives an instruction to do otherwise.

The above flow may be thought of as scheduling an upload according to one of two operating modes, namely a standard (or initialization) scheduling mode 310 and a simplified scheduling mode 320. Once initialization of resources (such as allocation and configuration) occurs according to an upload scheduling request in 310, the flow transitions to a simplified scheduling mode 320, and remains there until a determination is made at 333 that the mode cannot be maintained. If the mode cannot be maintained, the flow reverts to the standard scheduling mode 310.

The standard scheduling mode 310 may optionally include, after the configuration 315 and before a transition to the simplified scheduling mode 320, a signal parameter check 317 similar to that of operations 323 and 333. As a complete configuration has just occurred at 315, it is expected that the parameters will be in accordance with this configuration, and a determination related to this may be omitted. Nonetheless, it might be the case that the parameters could not be brought within a predetermined tolerance threshold or range for an upload by the configuration. If the parameters are within the predetermined tolerance threshold or range (Yes at 317), the flow proceeds to 321 to await a simplified request; that is, a transition to the simplified scheduling mode 320 occurs. If not (No at 317), the flow returns to 311 to await another upload scheduling request; that is, there is no transition and the standard scheduling mode 310 remains in effect.

These and related processes, and other necessary instructions, may be encoded as executable instructions on one or more non-transitory computer-readable media, such as hard disc drives or optical discs, and executed using one or more computer processors, in concert with an operating system or other suitable measures. Likewise, one or more of the above components described above may be implemented as instructions stored on a computer-readable storage medium and executable by at least one processor (and/or may include at least one processor).

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In a software implementation, the software may include a plurality of computer executable instructions, to be implemented on a computer system. Prior to loading in a computer system, the software may reside as encoded information on a suitable tangible, non-transitory, computer-readable storage medium, such as magnetically, optically, or other suitably encoded or recorded media. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In certain embodiments, the computer-readable storage medium may take the form of pre-existing data storage (such as "cloud storage") accessible through an operably coupled network means (such as the Internet). A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar. The computer-readable program instructions may execute entirely on a user's computer, partly on the user's computer, as a stand-alone software package, partly on the user's computer and partly on a remote computer or server, or entirely on the remote computer or server. In scenarios involving a remote computer or server, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects or operations.

In certain implementations, a system includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 4:
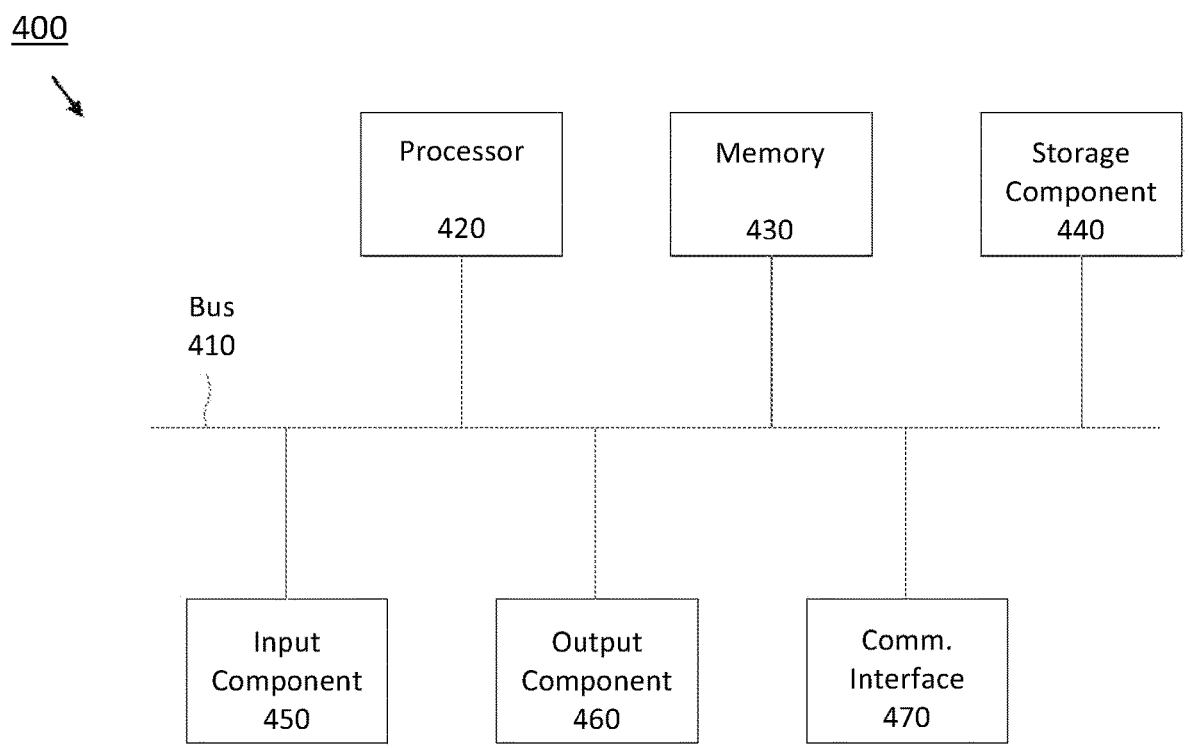
FIG. 4 is a diagram of example components of a device on which embodiments of the systems and/or methods described herein may be implemented.

FIG. 4 is a diagram of example components of a device 400. Device 400 may correspond to mobile device 110, radio unit 122, and/or distributed unit 130. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 may be implemented in hardware, firmware, or a combination of hardware and software. Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

In embodiments, any one of the operations or processes of FIGS. 2A-2C and 3 may be implemented by or using any one of the elements illustrated in FIG. 4.

The foregoing disclosure provides illustration and description, but is not intended to be exhaustive or to limit the implementations to the precise form disclosed. Modifications and variations are possible in light of the above disclosure or may be acquired from practice of the implementations.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for dual-mode scheduling of a data transfer between a network and a user device, the method comprising, on at least one processor:
    based on a scheduling request of the data transfer received from the user device, operating a first data transfer cycle by:
        selecting a first transfer time for transferring a first data packet of the data transfer, and
        allocating at least one system resource for use in the data transfer, the allocated system resource provided with a configuration for the data transfer;
    based on receipt of a signal indicating readiness for transfer of a second data packet of the data transfer, operating a second data transfer cycle by:
        determining a value of at least one predetermined signal parameter of the user device,
        selecting a second transfer time for transferring the second data packet of the data transfer, and
        maintaining the configuration of the allocated system resource during the second transfer time based on the value of the predetermined signal parameter; and
    based on receipt of a signal indicating readiness for transfer of a third data packet of the data transfer, operating a third data transfer cycle by:
        determining an updated value of the predetermined signal parameter of the user device,
        selecting a third transfer time for transferring the third data packet of the data transfer, and
        altering the configuration of the allocated system resource prior to the third transfer time based on the updated value of the predetermined signal parameter.

2. The method of claim 1,
    wherein the configuration of the allocated system resource is selectively altered based on a comparison of the updated value of the predetermined signal parameter with a predetermined value range.

3. The method of claim 1, wherein the operating of the third data transfer cycle further includes:
    determining a corrected value of the predetermined signal parameter of the user device following the reconfiguring of the allocated system resource; and
    based on the corrected value of the predetermined signal parameter, transmitting, to the user device, a signal indicating a re-initialization requirement.

4. The method of claim 1, wherein the operating of the third data transfer cycle further includes:
    determining a corrected value of the predetermined signal parameter of the user device following the reconfiguring of the allocated system resource; and
    based on the corrected value of the predetermined signal parameter, deallocating the allocated system resource after the third transfer time.

5. The method of claim 4,
    wherein the configuration is selectively altered based on a comparison of the updated value of the predetermined signal parameter with a predetermined value range; and
    wherein the allocated system resource is selectively deallocated based on a comparison of the corrected value of the predetermined signal parameter with the predetermined value range.

6. The method of claim 1,
    wherein the operating of the first data transfer cycle further includes determining an initial value of the predetermined signal parameter of the user device; and
    wherein the second data transfer cycle is selectively operated based on the initial value of the predetermined signal parameter.

7. The method of claim 1,
    wherein the first transfer time is scheduled according to a first wait period;
    wherein the second transfer time is scheduled according to a second wait period shorter in duration than the first wait period; and
    wherein the third transfer time is scheduled according to a third wait period longer in duration than the second wait period.

8. An electronic device for dual-mode scheduling of a data transfer between a network and a user device, the device comprising:
    at least one wireless communication module configured to transmit and receive a wireless signal;
    at least one non-volatile memory electrically configured to store computer program code; and
    at least one processor operatively connected to the at least one wireless communication module and the at least one non-volatile memory, the at least one processor being configured to operate as instructed by the computer program code, the computer program code including:
        first data transfer code configured to cause at least one of the at least one processor to, based on a scheduling request of the data transfer received from the user device through the at least one wireless communication module, select a first transfer time for transferring a first data packet of the data transfer, and allocate at least one system resource for use in the data transfer, the allocated system resource provided with a configuration for the data transfer;
        second data transfer code configured to cause at least one of the at least one processor to, based on receipt of a signal indicating readiness for transfer of a second data packet of the data transfer through the at least one wireless communication module, determine a value of at least one predetermined signal parameter of the user device, select a second transfer time for transferring the second data packet of the data transfer, and maintain the configuration of the allocated system resource during the second transfer time based on the value of the predetermined signal parameter; and
        third data transfer code configured to cause at least one of the at least one processor to, based on receipt of a signal indicating readiness for transfer of a third data packet of the data transfer through the at least one wireless communication module, determine an updated value of the predetermined signal parameter of the user device, select a third transfer time for transferring the third data packet of the data transfer, and alter the configuration of the allocated system resource prior to the third transfer time based on the updated value of the predetermined signal parameter.

9. The device of claim 8,
wherein the configuration of the allocated system resource is selectively altered based on a comparison of the updated value of the predetermined signal parameter with a predetermined value range.

10. The device of claim 8, wherein the third data transfer code is further configured to cause at least one of the at least one processor to:
determine a corrected value of the predetermined signal parameter of the user device following the reconfiguring of the allocated system resource; and
based on the corrected value of the predetermined signal parameter, transmit, to the user device, a signal indicating a re-initialization requirement.

11. The device of claim 8, wherein the third data transfer code is further configured to cause at least one of the at least one processor to:
determine a corrected value of the predetermined signal parameter of the user device following the reconfiguring of the allocated system resource; and
based on the corrected value of the predetermined signal parameter, deallocate the allocated system resource after the third transfer time.

12. The device of claim 11,
wherein the configuration is selectively altered based on a comparison of the updated value of the predetermined signal parameter with a predetermined value range; and
wherein the allocated system resource is selectively deallocated based on a comparison of the corrected value of the predetermined signal parameter with the predetermined value range.

13. The device of claim 8,
wherein the first data transfer code is further configured to cause at least one of the at least one processor to determine an initial value of the predetermined signal parameter of the user device; and
wherein the second data transfer code is selectively actuated based on the initial value of the predetermined signal parameter.

14. The device of claim 8,
wherein the first transfer time is scheduled according to a first wait period;
wherein the second transfer time is scheduled according to a second wait period shorter in duration than the first wait period; and
wherein the third transfer time is scheduled according to a third wait period longer in duration than the second wait period.

15. A non-transitory computer-readable recording medium having recorded thereon instructions executable by at least one processor to perform a method for dual-mode scheduling of a data transfer between a network and a user device, the method comprising:
based on a scheduling request of the data transfer received from the user device, operating a first data transfer cycle by:
selecting a first transfer time for transferring a first data packet of the data transfer, and
allocating at least one system resource for use in the data transfer, the allocated system resource provided with a configuration for the data transfer;
based on receipt of a signal indicating readiness for transfer of a second data packet of the data transfer, operating a second data transfer cycle by:
determining a value of at least one predetermined signal parameter of the user device,
selecting a second transfer time for transferring the second data packet of the data transfer, and
maintaining the configuration of the allocated system resource during the second transfer time based on the value of the predetermined signal parameter; and
based on receipt of a signal indicating readiness for transfer of a third data packet of the data transfer, operating a third data transfer cycle by:
determining an updated value of the predetermined signal parameter of the user device,
selecting a third transfer time for transferring the third data packet of the data transfer, and
altering the configuration of the allocated system resource prior to the third transfer time based on the updated value of the predetermined signal parameter.

16. The recording medium of claim 15,
wherein the configuration of the allocated system resource is selectively altered based on a comparison of the updated value of the predetermined signal parameter with a predetermined value range.

17. The recording medium of claim 15, wherein the operating of the third data transfer cycle further includes:
determining a corrected value of the predetermined signal parameter of the user device following the reconfiguring of the allocated system resource; and
based on the corrected value of the predetermined signal parameter, transmitting, to the user device, a signal indicating a re-initialization requirement.

18. The recording medium of claim 15, wherein the operating of the third data transfer cycle further includes:
determining a corrected value of the predetermined signal parameter of the user device following the reconfiguring of the allocated system resource; and
based on the corrected value of the predetermined signal parameter, deallocating the allocated system resource after the third transfer time.

19. The recording medium of claim 18,
wherein the configuration is selectively altered based on a comparison of the updated value of the predetermined signal parameter with a predetermined value range; and
wherein the allocated system resource is selectively deallocated based on a comparison of the corrected value of the predetermined signal parameter with the predetermined value range.

20. The recording medium of claim 15,
wherein the operating of the first data transfer cycle further includes determining an initial value of the predetermined signal parameter of the user device; and
wherein the second data transfer cycle is selectively operated based on the initial value of the predetermined signal parameter.

* * * * *